United States Patent
Sundström et al.

(10) Patent No.: US 8,583,170 B2
(45) Date of Patent: Nov. 12, 2013

(54) MULTI-BAND AGGREGATED SPECTRUM RECEIVER EMPLOYING FREQUENCY SOURCE REUSE

(75) Inventors: Lars Sundström, Lund (SE); Stefan Andersson, Lund (SE); Roland Strandberg, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 689 days.

(21) Appl. No.: 12/611,749

(22) Filed: Nov. 3, 2009

(65) Prior Publication Data

US 2010/0210272 A1   Aug. 19, 2010

Related U.S. Application Data

(60) Provisional application No. 61/152,811, filed on Feb. 16, 2009.

(51) Int. Cl.
*H04M 1/00* (2006.01)
*H04B 1/16* (2006.01)
*H04B 1/10* (2006.01)

(52) U.S. Cl.
USPC ........ 455/552.1; 455/205; 455/209; 455/216; 455/255

(58) Field of Classification Search
USPC ............... 455/90.2, 318, 323, 450, 550.1, 78, 455/188.1–191.1, 205–209, 216, 255–265
See application file for complete search history.

(56) References Cited

U.S. PATENT DOCUMENTS

| | | | |
|---|---|---|---|
| 7,027,833 B1 | 4/2006 | Goodman | |
| 7,684,763 B2 * | 3/2010 | Boos | 455/73 |
| 2003/0064699 A1 * | 4/2003 | Olsen | 455/318 |
| 2004/0102172 A1 * | 5/2004 | Hendin | 455/302 |
| 2006/0046773 A1 | 3/2006 | Aycin et al. | |
| 2006/0068740 A1 | 3/2006 | Yokoyama | |
| 2007/0178869 A1 | 8/2007 | Park et al. | |
| 2007/0224961 A1 | 9/2007 | Suzuki | |
| 2008/0113641 A1 | 5/2008 | Jeong et al. | |
| 2008/0279169 A1 * | 11/2008 | Zhang | 370/343 |
| 2008/0304435 A1 | 12/2008 | Behzad et al. | |
| 2009/0174486 A1 * | 7/2009 | Haralabidis et al. | 331/45 |

FOREIGN PATENT DOCUMENTS

WO   2010/000603 A1   1/2010

* cited by examiner

*Primary Examiner* — George Eng
*Assistant Examiner* — Nam Huynh
(74) *Attorney, Agent, or Firm* — Coats and Bennett, P.L.L.C.

(57) ABSTRACT

Efficient carrier aggregation is enabled in a receiver employing a single frequency source, and dividing the frequency source by different frequency dividing factors to generate two or more RF LO frequencies. Received signals are down-converted to intermediate frequencies by mixing with the respective RF LO frequencies. By utilizing only a single high frequency source, embodiments of the present invention avoid spurious and injection locking issues that arise when integrating two or more frequency sources, and additionally reduce power consumption as compared to a multiple frequency source solution.

20 Claims, 9 Drawing Sheets

US 8,583,170 B2

MULTI-BAND AGGREGATED SPECTRUM RECEIVER EMPLOYING FREQUENCY SOURCE REUSE

This application claims priority to U.S. provisional Patent Application No. 61/152,811, filed Feb. 16, 2009, titled Multi-Band Aggregated Spectrum Receiver, the disclosure of which is incorporated herein by reference in its entirety.

FIELD OF INVENTION

The present invention relates generally to wireless communication networks, and in particular to a method and receiver for carrier aggregation over non-contiguous frequency bands.

BACKGROUND

Long Term Evolution (LTE) is a set of enhancements to the Universal Mobile Telecommunications System (UMTS) that supports high data rates, low latency, low implementation and operating costs, and a seamless connection to legacy wireless communication networks. LTE will improve spectral efficiency, in part by supporting flexible carrier bandwidths.

One major issue for LTE implementation is the lack of free spectral bands that are sufficiently wide to allow very high data throughput. In most potential markets, available frequency bands are fragmented, and a continuous band of, e.g., 100 MHz or more likely will not be available.

To address this issue for LTE it has been suggested that each transmission link set-up between a base station and user equipment (UE) should be able to allocate several sub-bands, distributed over a very large bandwidth, to form an aggregated spectrum. Furthermore, the locations of these sub-bands are generally not pre-determined. In particular, the standard LTE 3GPP release 10 will provide that typically, a UE will receive information from only one carrier—the anchor carrier—but can be scheduled by the network to receive information from additional carriers—called component carriers—when needed or allowed.

These component carriers can be located within the same frequency band as the anchor carrier, and/or in completely different bands simultaneously. When scheduled to receive additional component carriers, the receiver must continue to receive the anchor carrier without interruption. One implication of this requirement is that the RF LO used for down-converting the anchor carrier may not be allowed to change. This calls for additional RF LO generators to be used for the component carriers. However, having several independent RF LO synthesizers increases receiver complexity, cost, and power consumption, and presents additional challenges in high frequency design, such as effective shielding and isolation.

SUMMARY

According to one or more embodiments described and claimed herein, efficient carrier aggregation is enabled in a receiver employing a single frequency source, and dividing the frequency source by different frequency dividing factors to generate two or more RF LO frequencies. Received signals are down-converted to intermediate frequencies by mixing with the respective RF LO frequencies. By utilizing only a single high frequency source, embodiments of the present invention avoid spurious and injection locking issues that arise when integrating two or more frequency sources, and additionally reduce power consumption as compared to a multiple frequency source solution.

One embodiment relates to a method of receiving communication signals in a RF wireless communication network. A first communication signal is received on a first carrier frequency, and a second communication signal is received on a second carrier frequency different from the first carrier frequency. A first frequency source is provided. The first frequency source is divided by a first factor to generate a first RF LO frequency. The first frequency source is also divided by a second factor, different from the first factor, to generate a second RF LO frequency different from the first RF LO frequency. The first received signal is down-converted to a first intermediate frequency signal by mixing the first received signal with the first RF LO frequency, and the second received signal is down-converted to a second intermediate frequency signal by mixing the second received signal with the second RF LO frequency.

Another embodiment relates to a radio frequency receiver operative in a wireless communication network. The receiver includes one or more antennas, each operative to receive one or more communication signals, each on a different carrier frequency. The receiver further includes a first frequency source. The receiver also includes a first divider operative to divide the first frequency source output by a first factor to generate a first RF LO frequency, and a second divider operative to divide the first frequency source output by a second factor, different from the first factor, to generate a second RF LO frequency different from the first RF LO frequency. The receiver additionally includes a first RF mixer operative to down-convert a first received signal to a first intermediate frequency signal by mixing the first received signal with the first RF LO frequency, and a second RF mixer operative to down-convert a second received signal to a second intermediate frequency signal, at a different frequency from the first intermediate frequency signal, by mixing the second received signal with the second RF LO frequency.

DETAILED DESCRIPTION

Figure 1:
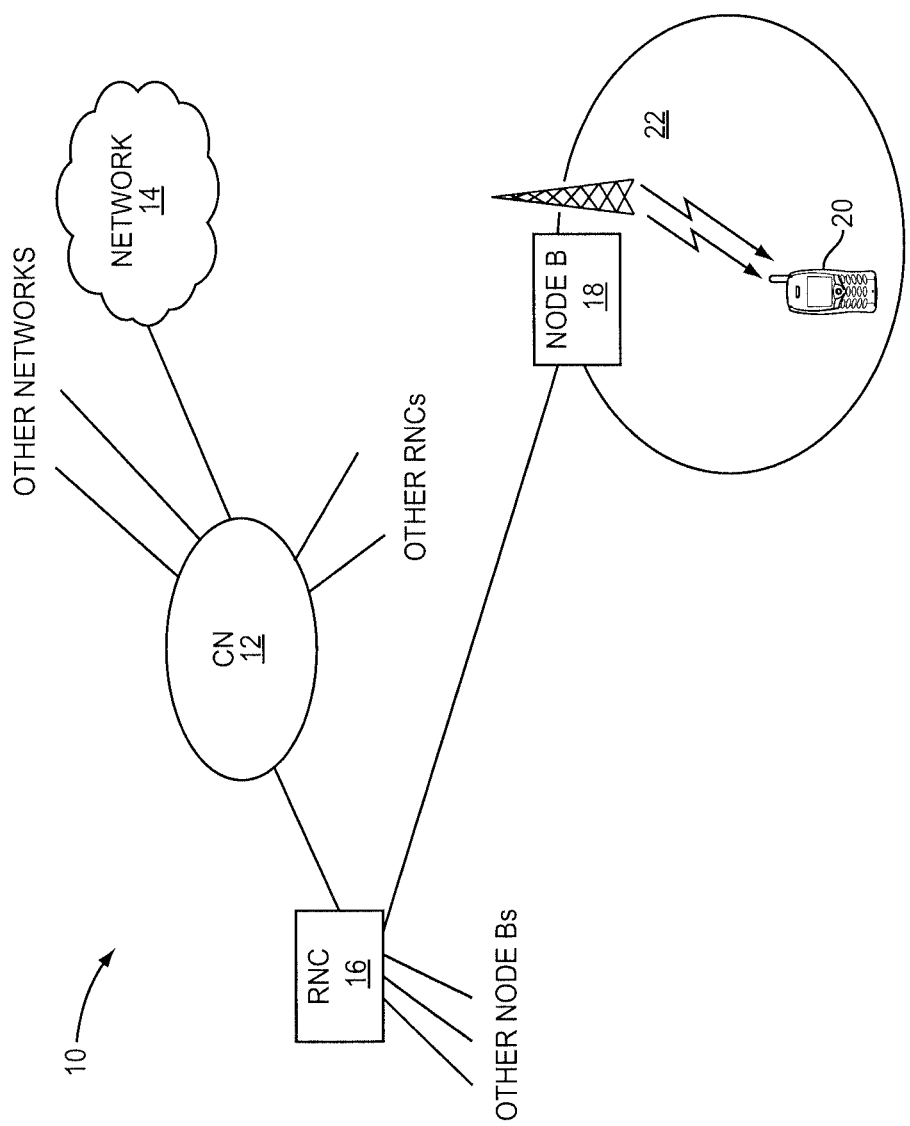
FIG. 1 is a functional block diagram of a wireless communication network.

FIG. 1 depicts a representative wireless communication network 10. Although described herein in the context of LTE extensions to UMTS, the network 10 may operate according to any protocol in which aggregated spectrum is utilized. In other networks, the network 10 elements depicted in FIG. 1 may be organized or denominated differently than those shown. However, those of skill in the art will readily discern the application of the present invention to other networks, given the teachings of the present disclosure in the LTE context.

The wireless communication network 10 includes a Core Network (CN) 12, communicatively connected to one or more other networks 14, such as the Public Switched Telephone Network (PSTN), the Internet, or the like. Communicatively connected to the CN 12 are one or more Radio Network Controllers (RNC) 16, which in turn control one or more NodeB or enhanced NodeB (eNodeB) stations 18. The NodeB 18, also known as a base station, includes radio frequency (RF) equipment and antennas necessary to effect wireless radio communications with one or more user equipment (UE) 20 within a geographic region, or cell 22. As depicted, the NodeB 18 may transmit data signals to the UE 20 on two or more carrier frequencies—an anchor carrier frequency and one or more component carrier frequencies. The anchor and component carriers may be within the same frequency band, and/or may be widely separated in frequency.

Transceiver circuits for wireless communication typically contain a single dedicated synthesizer for the receiver part. To support multiple bands, spanning several octaves in frequency, the oscillator inside the synthesizer may be designed to operate at a frequency at least twice as high as the highest frequency to be used in the receiver for down-converting the received signal. Modern process technology enables oscillators to run at multiplies of the actual local oscillator (LO) frequency with acceptable power consumption, enabling new opportunities in transceiver design for power efficient wireless communication.

Figure 2:
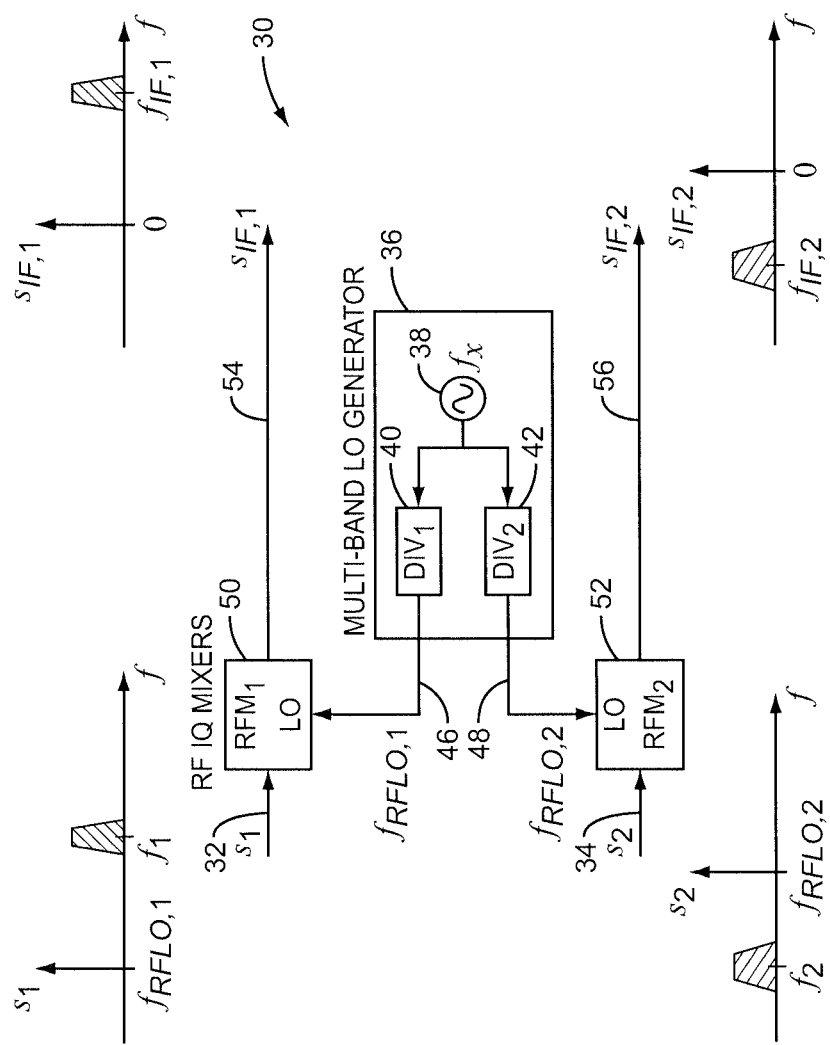
FIG. 2 is a functional block diagram of a portion of a receiver, featuring a single frequency source divided to generate two RF LO frequencies.

FIG. 2 depicts a portion of a receiver 30 generating separate RF LO frequencies from a common frequency source 38, such as a crystal oscillator. RF communication signals 32 ($s_1$) and 34 ($s_2$) are received at one or more antennas (not shown), and front-end processed by, e.g., one or more low-noise amplifiers, analog filters, or the like (not shown). A multi-band LO frequency generator 36 comprises a single frequency source 38 and two or more frequency dividers 40, 42. Each frequency divider 40, 42 divides the output of the frequency source 38 by a different factor $N_n$, generating different radio frequency local oscillator (RF LO) frequencies $f_{RFLO,1}$ 46 and $f_{RFLO,2}$ 48, respectively. The RF LO frequencies 46, 48 down-convert, or frequency-translate, the received communication signals 32, 34 to lower intermediate frequencies (IF) by mixing with the received communication signals 32, 34 in RF IQ mixers 50 and 52, respectively. As known in the art, an RF IQ mixer frequency-translates a complex signal by separately mixing the In-phase and Quadrature components of the signal with a reference frequency. The RF IQ mixers 50 and 52 output intermediate frequency signals 54 and 56, respectively, for further processing by the receiver 30.

In general, the frequency division factors of the frequency dividers 40, 42 are different, selected based on the carrier frequencies of the received communication signals 32, 34, and the desired intermediate frequency of the IF signals 54, 56. The frequency division factors and the frequency of the common frequency source 38 are selected according to $$f_{RFLO,1} = \frac{f_x}{N_1} \text{ and } f_{RFLO,2} = \frac{f_x}{N_2} \text{ where}$$

$f_x$ is the frequency of the source 38, $N_1$ is the frequency dividing factor of the frequency divider 40, $N_2$ is the frequency dividing factor of the frequency divider 42, $f_{RFLO,1}$ is the RF LO frequency 46, and $f_{RFLO,2}$ is the RF LO frequency 48. In one embodiment, the frequency dividing factors $N_1$ and $N_2$ are integer numbers, as frequency dividers with integer ratios are easier to design and less complex than frequency dividers with arbitrary ratios. Also, as depicted in FIG. 2, the RF LO frequencies 46, 48 may be above or below the received signal carrier frequencies. Although in general, the frequency dividing factors $N_1$ and $N_2$ are different, and greater than one, this is not necessarily the case. For example, one (or both) of the frequency dividing factors $N_1$, $N_2$ may equal one, in which case the source frequency $f_x$ is used as the relevant RF LO frequency 46, 48. Furthermore, in one embodiment, the frequency dividing factors $N_1$ and $N_2$ are equal, in which case $f_{RELO,1} = f_{RFLO,2}$.

Figure 3:
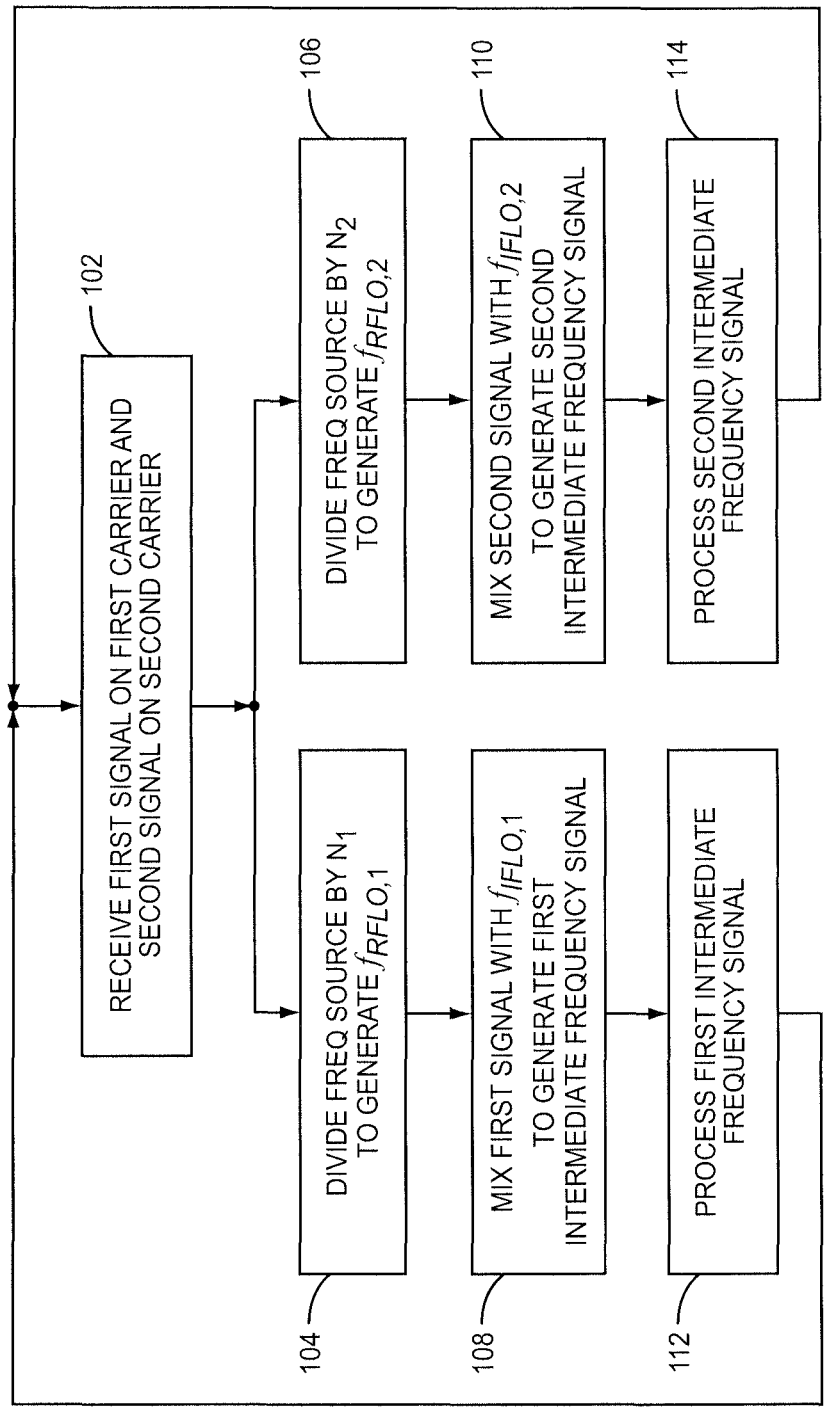
FIG. 3 is a flow diagram of a method of receiving multiple RF wireless communication signals.

FIG. 3 depicts a method 100 of receiving two or more communication signals in a RF wireless communication network. At least a first communication signal 32 on a first carrier and a second communication signal 34 on a second carrier (the first and second carriers at different frequencies) are received (block 102) and front-end processed. A single frequency source 38 is divided by $N_1$ to generate $f_{RFLO,1}$ (block 104), and the same source 38 is divided by $N_2$ to generate $f_{RFLO,2}$ (block 106). The first signal 32 is mixed with $f_{RFLO,1}$ to generate a first intermediate frequency signal 54 (block 108), and the second signal 34 is mixed with $f_{RFLO,2}$ to generate a second intermediate frequency signal 56 (block 110). The first and second intermediate frequency signals 54, 56 are then further processed by the receiver 30 (blocks 112, 114).

Because the selection of RF LO frequencies 46, 48 are limited by the implementation of the multi-band LO generator 36, the IF frequencies 54, 56 may be different for the two signals 32, 34, depending on the corresponding RF carrier frequencies. Also, depending on the requirements on processing of the signals to follow after down-conversion, the range of desired IF frequencies may vary.

Figure 4:
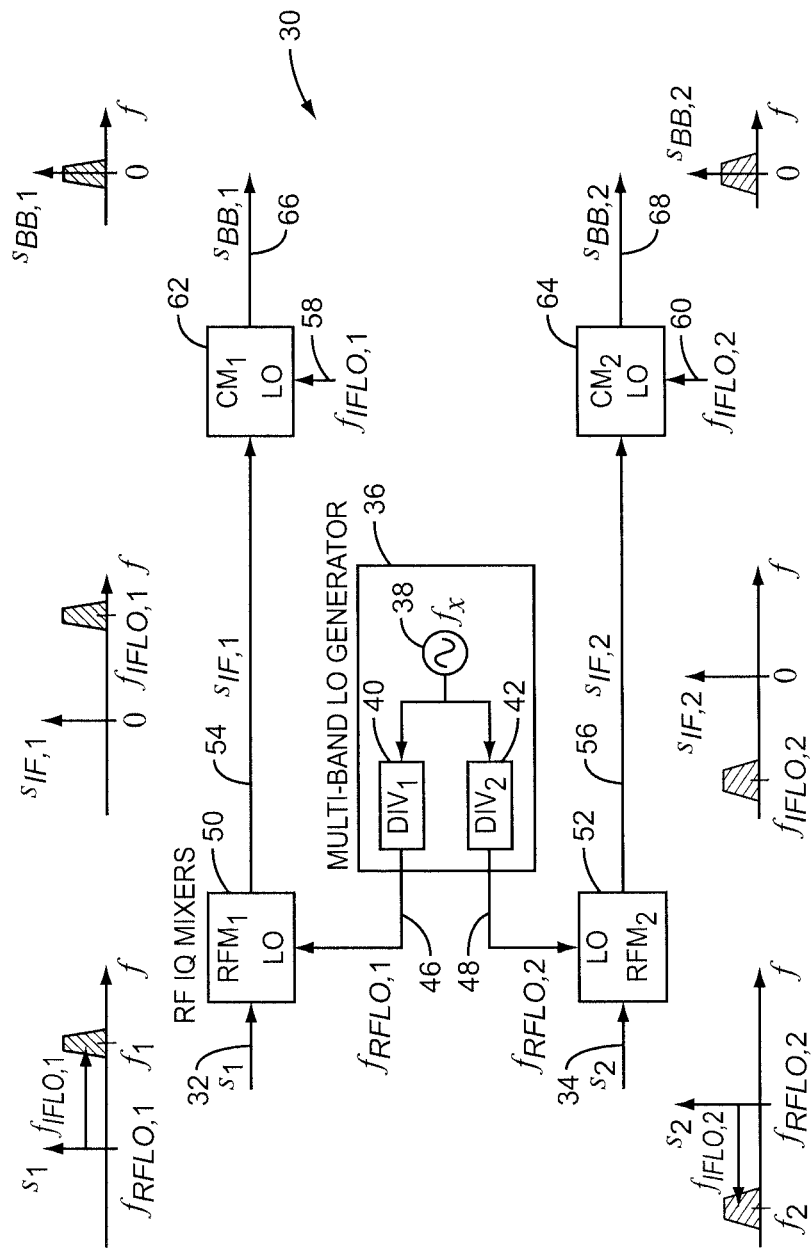
FIG. 4 is a functional block diagram of the receiver of FIG. 2 with dual complex mixers performing intermediate frequency (IF) down-conversion using different IF LO frequencies.

FIG. 4 depicts one embodiment of the receiver 30 that includes a second down-conversion stage for each signal path. In particular, the IF signals 54, 56 are down-converted to baseband (or low IF frequencies) signals 66, 68 by mixing with intermediate frequency local oscillator (IF LO) frequencies 58 and 60, in complex mixers 62 and 64. In the embodiment depicted in FIG. 4, the IF LO frequencies 58, 60 are orders of magnitude lower than the RF LO frequencies 46, 48. As such, they may be easily generated, such as by dividing conventional digital clock signals or the like, without causing interference issues in combination with the RF LO generator 36. Additionally, the circuits generating the IF LO frequencies 58, 60 may consume much less power than the RF LO generator 36.

If the complex mixers 62, 64 provide frequency translation with high degree of image suppression and no conversion of signals at IF LO harmonics, no filtering of image frequencies and harmonic frequencies would be required. In practice, the image suppression will be finite, and the IF LO will exhibit some harmonic content. Therefore, depending on the link budget of the receiver, additional filtering of the IF signals 54, 56 may be required to suppress signal levels at image frequencies, as well as at harmonics of the LO frequencies, before down-converting the signals 54, 56.

While the RF IQ mixers 50, 52 most likely will be implemented in analog domain, the complex mixers 62, 64 may operate either in the analog or digital domain, depending on the maximum frequency of the IF signals 54, 56. When operating in digital domain, appropriate analog-to-digital conversion should be performed between the RF IQ mixers 50, 52 and the complex mixers 62, 64.

The architectures discussed above generally result in different IF LO frequencies 58, 60 for down-converting the different IF signals 54, 56, particularly when the set of frequency dividing factors for the multi-band RF LO generator 38 are limited (e.g., restricted to integer values).

Figure 5:
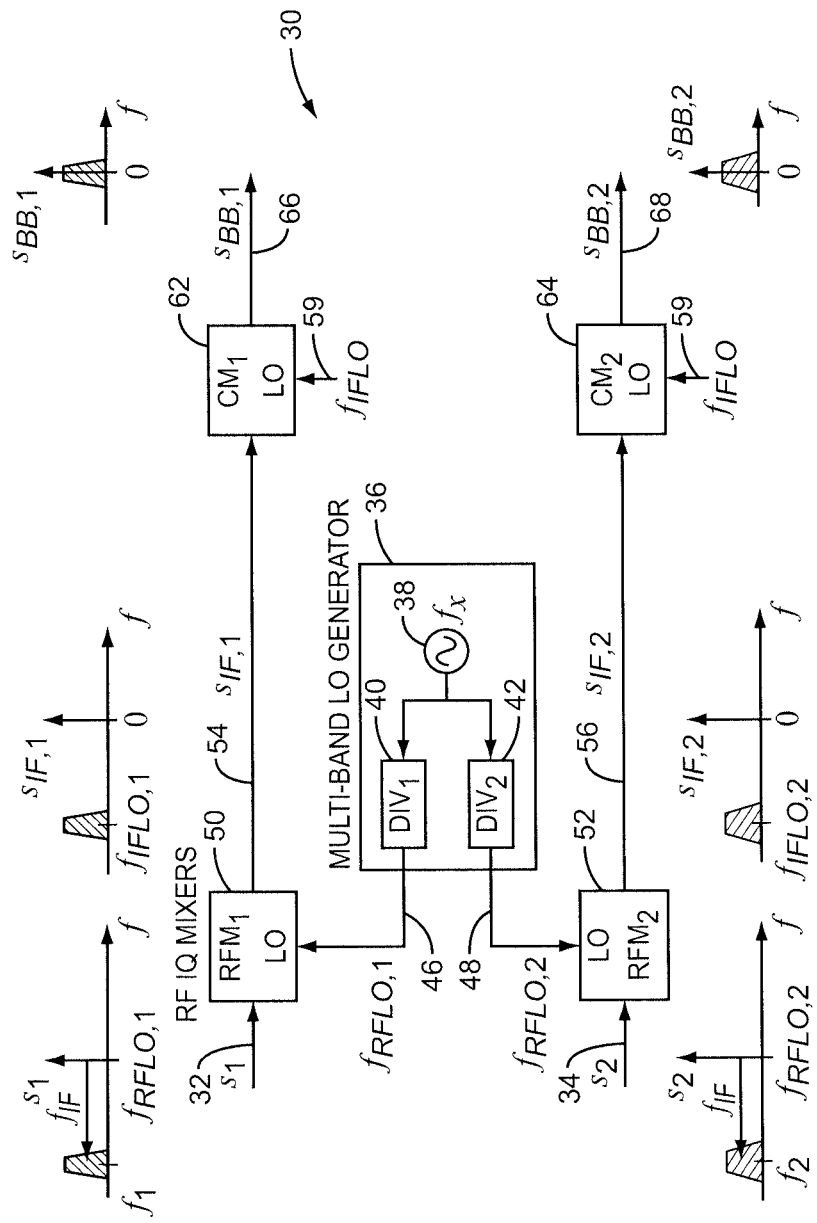
FIG. 5 is a functional block diagram of the receiver of FIG. 2 with dual complex mixers performing IF down-conversion using a single IF LO frequency.

FIG. 5 depicts an embodiment in which other constraints are introduced to further reduce complexity, such that only one IF LO frequency 59 is required for the down-conversion of both IF signals 54, 56. Note that in this embodiment, both of the RF LO frequencies 46, 48 are higher than the carrier frequencies of the corresponding received signals 32, 34. Denoting the carrier frequency of the first received signal 32 as $f_1$ and that of the second received signal 34 as $f_2$, the following equations must be satisfied for use of the single IF LO frequency 59:

$$f_x = \frac{N_1 \cdot N_2 \cdot (f_1 - f_2)}{N_2 - N_1} \text{ and}$$

$$f_{IFLO} = \frac{N_1 f_1 - N_2 f_2}{N_2 - N_1} \text{ where}$$

$f_x$ is the frequency source 38, $N_1$ is the frequency dividing factor for the frequency divider 40, $N_2$ is the frequency dividing factor for the frequency divider 42, and $f_{IFLO}$ is the single IF LO frequency 59. The values of $f_1$ and $f_2$ are determined by the network, and the choice of values for $N_1$ and $N_2$ may be constrained (e.g., to integer values). This constrains the values of $f_x$ and $f_{IFLO}$ to satisfy the above equations.

Although in this embodiment, both of the RF LO frequencies 46, 48 are higher than the carrier frequencies of the corresponding received signals 32, 34, the same equations above apply if both RF LO frequencies 46, 48 are lower than the corresponding carrier frequencies. For the case when one RF LO frequency 46, 48 is higher than the carrier frequency of the received signal 32, 34 and the other one is lower (or vice versa), the following equations must be satisfied:

$$f_x = \frac{N_1 \cdot N_2 \cdot (f_1 = f_2)}{N_1 + N_2} \text{ and}$$

$$f_{IFLO} = \frac{N_1 f_1 - N_2 f_2}{N_1 + N_2}.$$

In appropriate situations, receiver complexity and cost may be minimized by application of the above equations to down-convert two or more intermediate frequency signals 54, 56 to baseband signals 66, 68. However, in general, two or more IF LO frequencies 58, 60 may need to be generated (FIG. 4).

Figure 6:
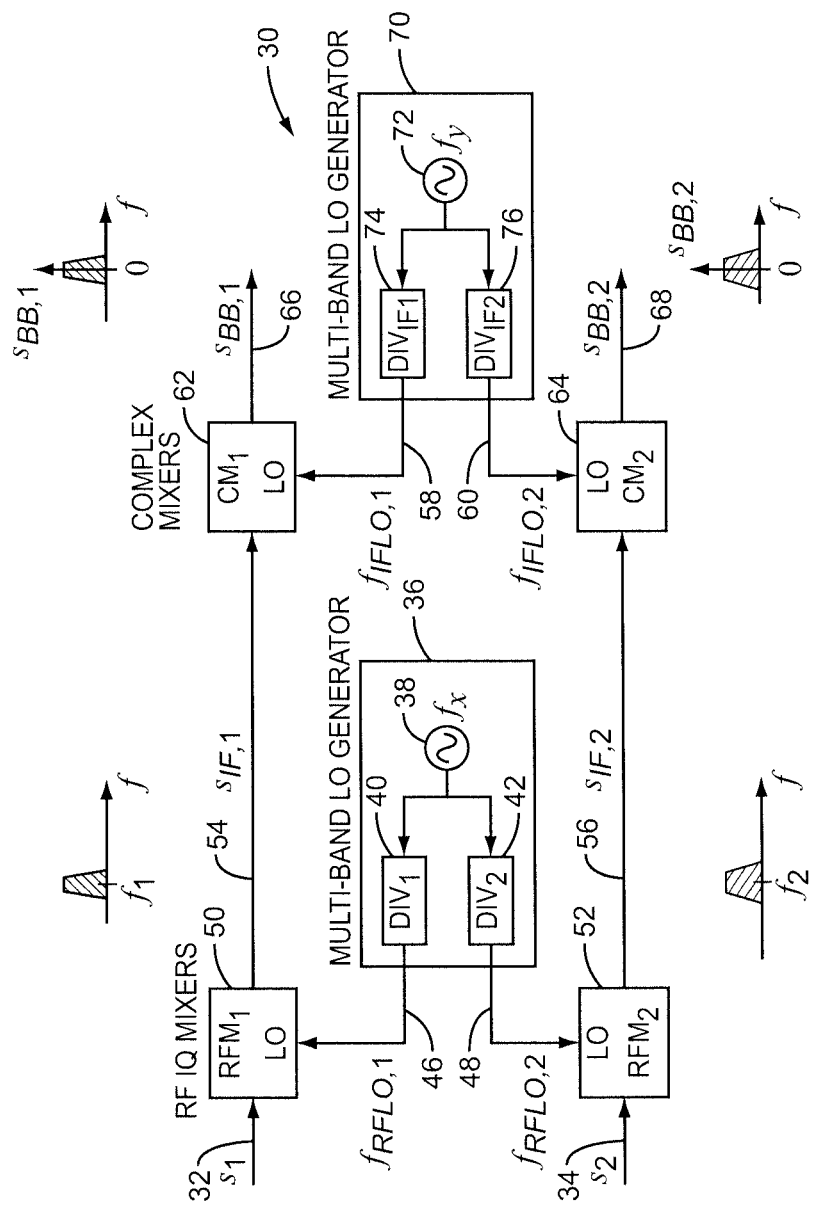
FIG. 6 is a functional block diagram of the receiver of FIG. 4 where different IF LO frequencies are generated from a single frequency source.

FIG. 6 depicts an efficient, general solution for the generation of two or more RF LO frequencies 46, 48 from a single frequency source 38, and a similarly, the generation of two or more IF LO frequencies 58, 60 from a separate frequency source 72. The multi-band LO generator 70 comprises a frequency source 72 and two or more frequency dividers 74, 76. The frequency dividers 74, 76 divide the source 72 frequency by different frequency divider factors $M_n$, such that:

$$f_{IFLO,1} = \frac{f_y}{M_1} \text{ and } f_{IFLO,2} = \frac{f_y}{M_2},$$

where $f_y$ is the frequency of the source 72. Depending on the desired location of the RF LO frequencies 46, 48 with respect to the corresponding RF signals 32, 34, equations can be derived as above to define the constraints on the design variables $N_1$, $N_2$, $M_1$, $M_2$, $f_x$, and $f_y$, once the range of carrier frequencies $f_1$ and $f_2$ are known.

In the above embodiments, the RF LO frequencies 46, 48 have been selected such that both received signals 32, 34 will have a non-zero center frequency after the RF down-conversion. Consequently, both IF signals 54, 56 need to be further down-converted using complex mixers 62, 64. In one embodiment, particularly applicable to LTE 3GPP release 10 systems supporting carrier aggregation, one receiver chain is dedicated to the anchor carrier signal 32 ($s_1$).

Figure 7:
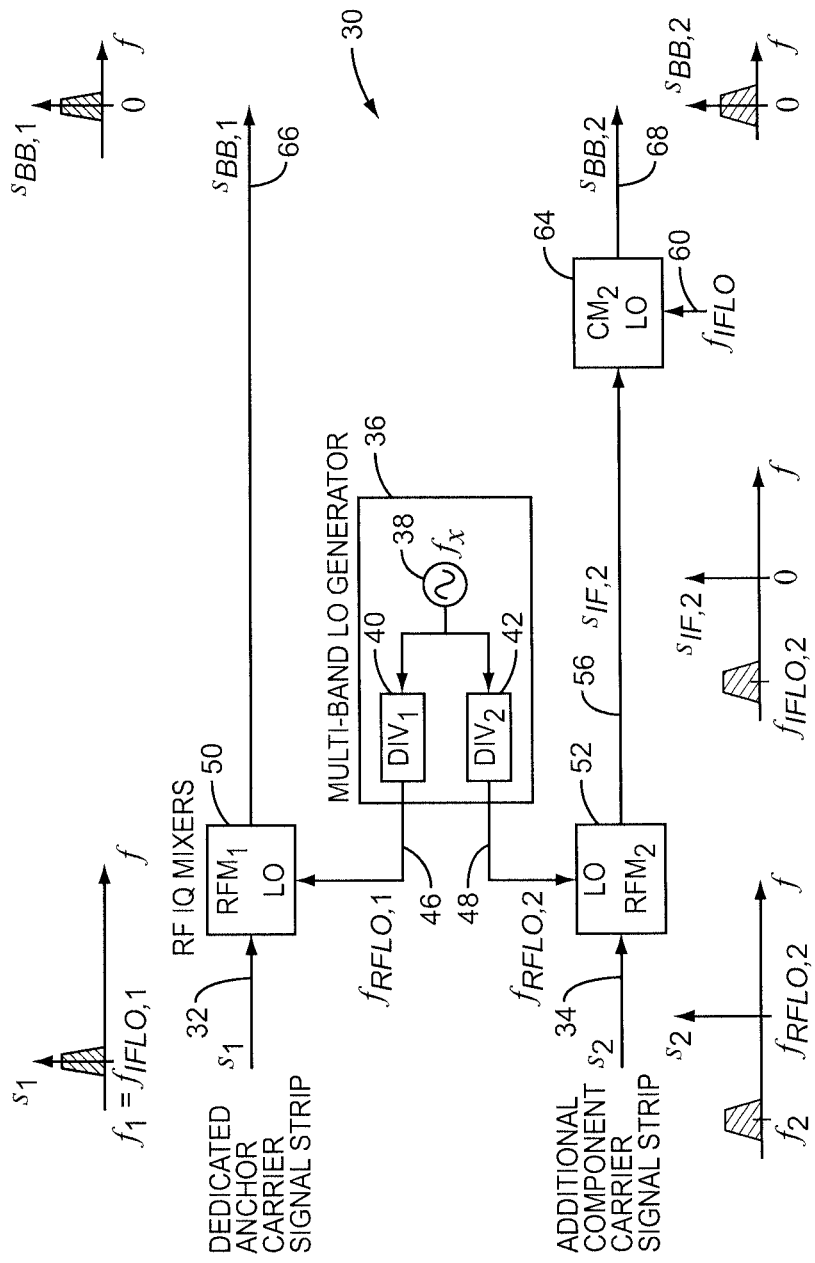
FIG. 7 is a functional block diagram of the receiver of FIG. 2 with one RF LO frequency down-converting the anchor carrier signal to baseband, and a complex mixer down-converting a component carrier to baseband.

FIG. 7 depicts a receiver 30 in which the RF LO frequency 46 is set to the carrier frequency of the anchor signal 32, and the RF IQ mixer 50 converts the anchor signal 32 directly to the baseband signal 66. In this embodiment, no additional complex IF mixing is required for the anchor carrier signal 32. The anchor carrier signal 32 can be received continuously, without interruption, and without the potentially harmful effects caused by limited image rejection in complex mixers 62, 64. This results, however, in one degree less of freedom with respect to the RF LO frequency 48 for one or more additional component carrier signals 34, which now may be located further away from the closest RF LO frequency 48 that can be generated.

The embodiments discussed above generally result in a number of independent baseband and/or low IF output signals 66, 68. These signals 66, 68 can be further processed independently as typical in radio receivers, e.g., including channel filtering to reduce the power of blocker signals, analog-to-digital conversion, and the like.

Figure 8:
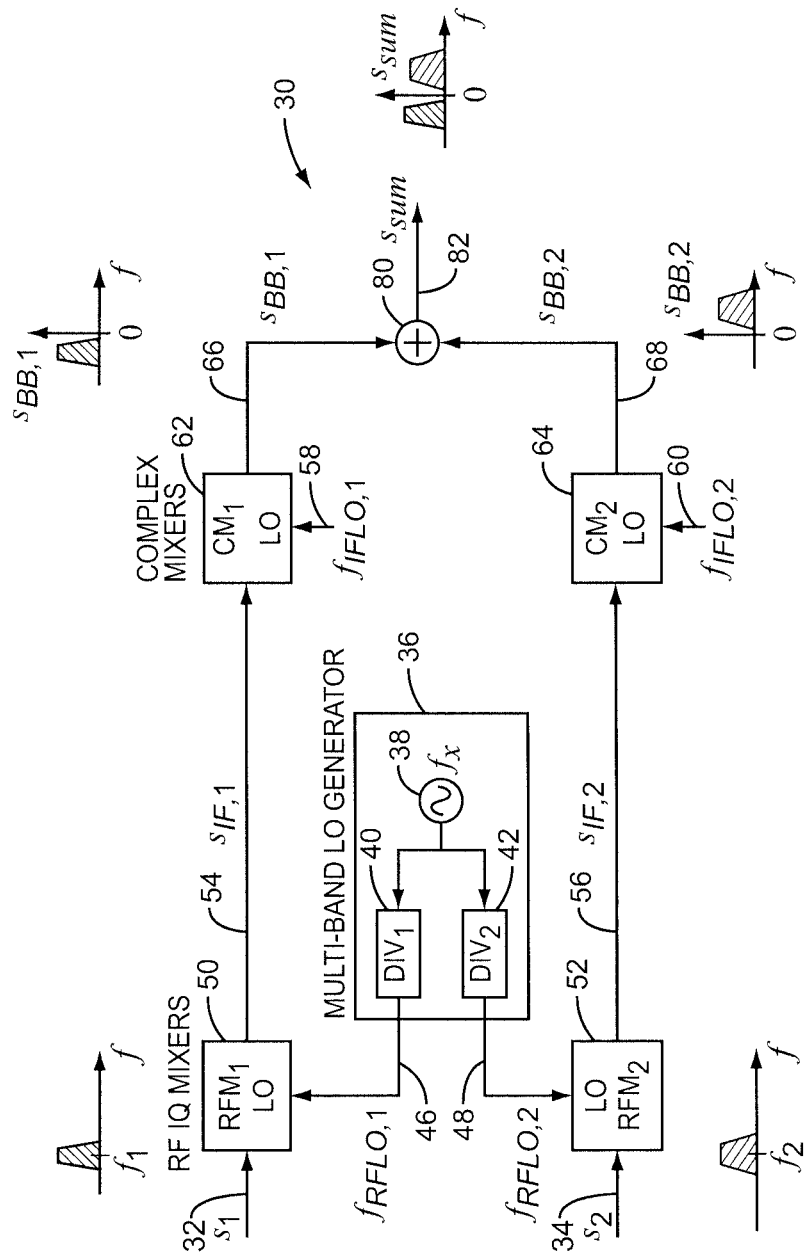
FIG. 8 is a functional block diagram of the receiver of FIG. 4 wherein the non-overlapping baseband signals are combined for processing in a single wide-bandwidth receiver chain.

FIG. 8 depicts an embodiment employing an alternative approach, in which the baseband or low IF signals 66, 68 are recombined after down-conversion at the complex mixers 62, 66 by summing circuit 80, to generate a wider-bandwidth baseband signal 82. Those of skill in the art will note that in alternative embodiments, the recombination may occur after downstream channel filters, analog-to-digital conversion, or at other points in the receiver chain. This recombination requires that the signals 66, 68 are allocated at different frequency ranges such that they do not overlap, and hence do not interfere with each other.

A major benefit of this embodiment is that only a single signal 82 processing path (albeit with larger bandwidth) is required to handle all of the signals 66, 68 after recombination. In most practical implementations, additional filtering will be required, as interfering signals adjacent to the desired signals 66, 68 will be present in each signal path. If interferers are not removed or sufficiently attenuated, they may turn up inside the bands of other desired signals 66, 68.

In the embodiments discussed above, the receiver 30 is depicted as receiving two communication signals 32, 34, generating two RF LO frequencies 46, 48 from a single frequency source 38, and down-converting the received signals 32, 34 using the RF LO frequencies 46, 48 in two RF IQ mixers 50, 52 that initiate separate receiver processing chains. The restriction to two receive signals 30 to 34, RF LO frequencies 46, 48, RF IQ mixers 50, 52, and the like is for simplicity of explanation only, and is not a limitation of the present invention. Rather, any number of component carrier frequency signals 34, in addition to an anchor carrier frequency signal 32, may be received and processed according to the circuit and methods described herein.

Figure 9:
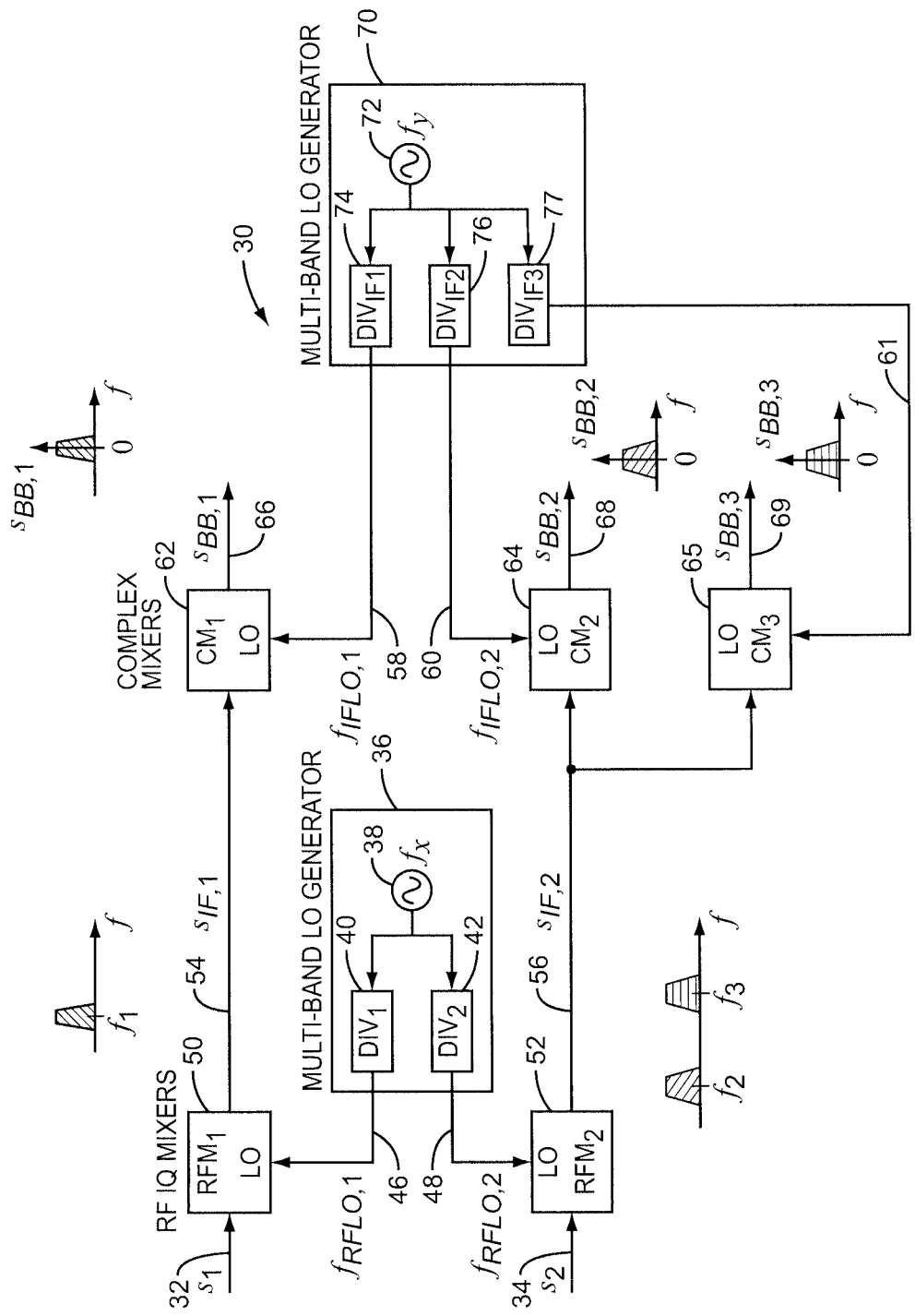
FIG. 9 is a functional block diagram of the receiver of FIG. 6 including three IF LO frequencies generated from a single frequency source. and two baseband signals recovered from an IF signal.

Furthermore, several embodiments described herein (such as FIGS. 4-8) incorporate one or more complex mixers 62, 64 to further down-convert IF signals 54, 56 to baseband signals 66, 68 using one or more IF LO frequencies 58, 59, 60. The present invention is not limited to the configuration depicted in these embodiments, in which a separate complex mixer 62, 64 is deployed to down-convert each IF signal 54, 56. In other embodiments, two or more complex mixers 62, 64 may be connected in parallel, each receiving the same IF signal 54, 56, but a different IF LO frequency 58, 59, 60, and hence each down-converting the IF signal 54, 56 to a different baseband signal 66, 68. For example, FIG. 9 depicts a third complex mixer 65, also down-converting IF signal 56 to a third baseband signal 69, using a third IF LO frequency 61. In the embodiment depicted, the third IF LO frequency 61 is generated by dividing the frequency source 72 by a third frequency divider 77, which is applicable to situations where the desired IF LO frequency 61 may be readily obtained from the frequency source $f_y$ 72 (e.g., via an integer divider $DIV_{IF3}$ 77). In other embodiments, the third IF LO frequency 61 may be generated otherwise, such as having a third frequency source for the reception of the third carrier.

The main feature of the multi-band ASR proposed is that it only requires a single core RF LO synthesizer. Therefore, the highly complex problem of having two or more independent synthesizers on the same chip that will otherwise cause spurious and injection locking issues is avoided altogether. Additionally, power consumption will be much lower with the proposed technique since RF LO synthesizers are known to consume a significant amount of power.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of simultaneously receiving communication signals with multi-carrier aggregation spread over several bands in a radio frequency (RF) wireless communication network, comprising:
   receiving a first communication signal on a first carrier frequency in an aggregated multi-carrier spectrum;
   receiving a second communication signal on a second carrier frequency in said aggregated multi-carrier spectrum different from the first carrier frequency;
   providing a first frequency source;
   dividing the first frequency source output by a first factor to generate a first RF local oscillator (RF LO) frequency;
   dividing the first frequency source output by a second factor, different from the first factor, to generate a second RF LO frequency different from the first RF LO frequency;
   down-converting the first received signal to a first intermediate frequency signal by mixing the first received signal with the first RF LO frequency; and
   down-converting the second received signal to a second intermediate frequency signal, at a different frequency from the first intermediate frequency signal, by mixing the second received signal with the second RF LO frequency.

2. The method of claim 1 further comprising:
   receiving a third communication signal on a third carrier frequency different from the first or second carrier frequency;
   dividing the first frequency source by a third factor different from the first or second factor to generate a third RF LO frequency different from the first or second RF LO frequency;
   down-converting the third received signal to a third intermediate frequency signal, at a different frequency from the first or second intermediate frequency signal, by mixing the third received signal with the third RF LO frequency.

3. The method of claim 1 wherein the first intermediate frequency signal is a first baseband frequency signal, and further comprising:
   generating an intermediate frequency local oscillator (IF LO) frequency; and
   down-converting the second intermediate frequency signal to a second baseband frequency signal by mixing the second intermediate frequency signal with the IF LO frequency.

4. The method of claim 1 further comprising:
   generating an intermediate frequency local oscillator (IF LO) frequency; and
   down-converting the first and second intermediate frequency signals to first and second baseband frequency signals by mixing the respective intermediate frequency signals with the IF LO frequency.

5. The method of claim 4 wherein both the first and second RF LO frequencies are either above or below the respective first and second carrier frequencies, and wherein $$f_x = \frac{N_1 \cdot N_2 \cdot (f_1 - f_2)}{N_2 - N_1} \text{ and}$$

$$f_{IFLO} = \frac{N_1 f_1 - N_2 f_2}{N_2 - N_1} \text{ where}$$

$f_x$ is the first frequency source;
$f_{IFLO}$ is the IF LO frequency;
$N_1$ and $N_2$ are the first and second frequency dividing factors, respectively; and
$f_1$ and $f_2$ are the first and second carrier frequencies, respectively.

6. The method of claim 4 wherein one of the first and second RF LO frequencies is above the respective first or second carrier frequency and the other of the first and second RF LO frequencies is below the respective first or second carrier frequency, and wherein $$f_x = \frac{N_1 \cdot N_2 \cdot (f_1 + f_2)}{N_1 + N_2} \text{ and}$$

$$f_{IFLO} = \frac{N_1 f_1 - N_2 f_2}{N_1 + N_2} \text{ where}$$

$f_x$ is the first frequency source;
$f_{IFLO}$ is the IF LO frequency;
$N_1$ and $N_2$ are the first and second frequency dividing factors, respectively; and
$f_1$ and $f_2$ are the first and second carrier frequencies, respectively.

7. The method of claim 1 further comprising:
generating a first intermediate frequency local oscillator (IF LO) frequency;
generating a second IF LO frequency different from the first IF LO frequency;
down-converting the first intermediate frequency signal to a first baseband frequency signal by mixing the first intermediate frequency signal with the first IF LO frequency; and
down-converting the second intermediate frequency signal to a second baseband frequency signal by mixing the second intermediate frequency signal with the second IF LO frequency.

8. The method of claim 7 wherein generating the first and second IF LO frequencies comprises:
providing a second frequency source;
dividing the second frequency source by a third factor to generate a first IF LO frequency; and
dividing the second frequency source by a fourth factor, different from the third factor, to generate a second IF LO frequency different from the first IF LO frequency.

9. The method of claim 7 further comprising:
generating a third IF LO frequency different from the first or second IF LO frequency;
down-converting the second intermediate frequency signal to a third baseband frequency signal by mixing the second intermediate frequency signal with the third IF LO frequency.

10. The method of claim 8 further comprising:
dividing the second frequency source by a fifth factor, different from the third or fourth factor, to generate a third IF LO frequency different from the first or second IF LO frequency.

11. The method of claim 7 wherein the first and second baseband frequency signals are non-overlapping in frequency, and further comprising:
combining the first and second baseband frequency signals; and
further processing the combined first and second baseband frequency signals.

12. A radio frequency receiver operative in a wireless communication network, comprising:
one or more antennas, each operative to receive one or more communication signals, each on a different carrier frequency;
a first frequency source;
a first divider operative to divide the first frequency source output by a first factor to generate a first RF local oscillator (RF LO) frequency;
a second divider operative to divide the first frequency source output by a second factor, different from the first factor, to generate a second RF LO frequency different from the first RF LO frequency;
a first RF mixer operative to down-convert a first received signal received on a first carrier frequency in an aggregated multi-carrier spectrum to a first intermediate frequency signal by mixing the first received signal with the first RF LO frequency; and
a second RF mixer operative to down-convert a second received signal received on a second carrier frequency in said aggregated multi-carrier spectrum to a second intermediate frequency signal, at a different frequency from the first intermediate frequency signal, by mixing the second received signal with the second RF LO frequency.

13. The receiver of claim 12 further comprising:
a third divider operative to divide the first frequency source output by a third factor, different from the first or second factor, to generate a third RF LO frequency different from the first or second RF LO frequency; and
a third RF mixer operative to down-convert a third received signal to a third intermediate frequency signal, at a different frequency from the first or second intermediate frequency signal, by mixing the third received signal with the third RF LO frequency.

14. The receiver of claim 12 wherein the first intermediate frequency signal is a first baseband frequency signal, and further comprising:
an IF mixer operative to down-convert the second intermediate frequency signal to a second baseband frequency signal by mixing the second intermediate frequency signal with an intermediate frequency local oscillator frequency.

15. The receiver of claim 12 further comprising:
first and second IF mixers operative to down-convert the first and second intermediate frequency signals to first and second baseband frequency signals by mixing the respective intermediate frequency signals with an intermediate frequency local oscillator (IF LO) frequency.

16. The receiver of claim 12 further comprising:
a first IF mixer operative to down-convert the first intermediate frequency signal to a first baseband frequency signal by mixing the first intermediate frequency signal with a first intermediate frequency local oscillator (IF LO) frequency;
a second IF mixer operative to down-convert the second intermediate frequency signal to a second baseband frequency signal by mixing the second intermediate frequency signal with a second IF LO frequency different from the first IF LO frequency.

17. The receiver of claim 16 further comprising:
a second frequency source different from the first frequency source;
a third divider operative to divide the second frequency source output by a third factor to generate the first IF LO frequency; and
a fourth divider operative to divide the second frequency source output by a fourth factor, different from the third factor, to generate the second IF LO frequency.

18. The receiver of claim 16 further comprising:
a third IF mixer operative to down-convert the second intermediate frequency signal to a third baseband frequency signal by mixing the second intermediate frequency signal with a third IF LO frequency different from the first or second IF LO frequency.

19. The receiver of claim 18 further comprising:
a fifth divider operative to divide the second frequency source output by a fifth factor, different from the third or fourth factor, to generate the third IF LO frequency.

20. The receiver of claim 16 wherein the first and second baseband frequency signals are non-overlapping in frequency, and further comprising:
a summing circuit operative to combine the first and second baseband frequency signals for further processing.

* * * * *

UNITED STATES PATENT AND TRADEMARK OFFICE
CERTIFICATE OF CORRECTION

PATENT NO. : 8,583,170 B2  Page 1 of 1
APPLICATION NO. : 12/611749
DATED : November 12, 2013
INVENTOR(S) : Sundstrom et al.

It is certified that error appears in the above-identified patent and that said Letters Patent is hereby corrected as shown below:

In the Specification

In Column 2, Line 66, delete "source." and insert -- source --, therefor.

In Column 4, Line 22, delete "$f_{RELO,1}=f_{RFLO,2}$" and insert -- $f_{RFLO,1}=f_{RFLO,2}$ --, therefor.

In Column 5, Lines 12-13, delete "generator 38" and insert -- generator 36 --, therefor.

In Column 5, Lines 49-51, delete "$f_x = \frac{N_1 \cdot N_2 \cdot (f_1 = f_2)}{N_1 + N_2}$" and insert -- $f_x = \frac{N_1 \cdot N_2 \cdot (f_1 + f_2)}{N_1 + N_2}$ --, therefor.

Signed and Sealed this
Twelfth Day of August, 2014

Michelle K. Lee
*Deputy Director of the United States Patent and Trademark Office*